May 10, 1966  R. E. KURZ ETAL  3,250,539

SEAL WITH SPRING HOLDER

Filed March 25, 1963

INVENTORS
James H. Thayer
Robert E. Kurz
BY Charles F. Vajtek
Atty ited States Patent Office 3,250,539
Patented May 10, 1966

3,250,539
SEAL WITH SPRING HOLDER
Robert E. Kurz, Niles, and James H. Thayer, Chicago, Ill., assignors to Crane Packing Company, Morton Grove, Ill., a corporation of Illinois
Filed Mar. 25, 1963, Ser. No. 267,558
7 Claims. (Cl. 277—41)

This invention relates to rotary mechanical seals of the self-contained type.

There has been proposed a rotary mechanical seal comprising a subassembly secured to a shaft or the like and rotatable therewith, and a stationary seal seat against which an element of the subassembly is adapted to bear with a running fluid-tight fit. The subassembly is comprised of a number of elements among which are a housing of annular form adapted to be secured to the shaft or the like, within which are located a sealing washer, a relatively flexible secondary sealing element, one or more springs and a metal disc or the like for transmitting the spring pressure to the flexible secondary sealing element. Such seals are preassembled at the factory and shipped in this condition to the customer who then installs them on their respective shafts in the equipment made by the customer.

In the preassembled condition the sealing washer is held within the retainer by a snap ring. The free height of the spring or springs, however, is normally greater than the space provided for them when the sealing washer abuts upon the snap ring so that the excess or residual spring force is exerted upon the intervening flexible secondary sealing element to compress it against the stationary sealing washer.

The method employed to effect a seal between a secondary sealing element and the washer on the one hand and shaft on the other generally comprises urging the secondary sealing element against a conical surface on the washer which tends to distort the sealing element radially inwardly to cause it to contact the shaft. The residual spring pressure exerted upon the sealing element when the washer abuts upon the snap ring is sufficient to cause the intermediate or intervening flexible sealing element to be contracted at its thinnest section and thus to assume a diameter which is smaller than the diameter of the shaft upon which it is to be installed. This presents a serious assembly problem in that the contracted sealing element must be expanded before it can be threaded over a shaft, and its expansion can be accomplished only by a special very thin tool, or by a generous chamfer or radius on the end of the shaft, both of which add to the expense of the seal as a whole.

The principal object of this invention is to provide a means, in a shaft seal of the self-contained type, for relieving spring pressure from the flexible sealing element of the seal after the seal is assembled, but before it is installed on a shaft.

As a more specific object, this invention has within its purview the provision of a means for limiting the movement of the springs of a self-contained seal so that the secondary sealing element thereof is "unloaded," i.e., not subjected to spring pressure until the seal is installed on a shaft.

Among the more specific objects of this invention are the provisions of a means for limiting the expansion of a spring in a self-contained seal, which means, although initally installed by a rotary movement relative to the retainer for the seal, is nevertheless independent of tongue during the operation of the seal; the provision of a means for limiting the expansion of a spring in a self-contained seal which does not increase the length of the seal so that the improved seal is interchangeable with those now in use; and the further provision of a means for limiting the expansion of a spring in a self-contained seal which does not increase the number of parts normally used in such seal.

These and other objects of this invention will become apparent from the following detailed description when taken together with the accompanying drawings in which FIG. 1 is a quarter-sectional view of a seal assembly of the prior art to which the improvement of the present invention is to be applied;

Figure 1:
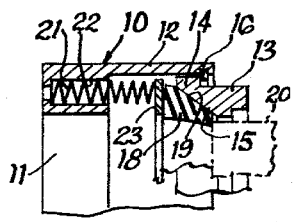

Referring first to FIG. 1 for a description of the problem posed by the prior art construction, there is shown a retainer 10 having a relatively solid rear portion 11 by which the retainer may be secured for rotation with a shaft 20 or the like, and a relatively thin cylindrical shell 12 extending forwardly from rear portion 11. Within thin shell 12 is disposed a portion of a rigid primary sealing washer 13 which is formed with a radially extending flange 14 near the rear portion thereof and with a tapered or frusto-conical surface 15 in the inner rear regions thereof. A snap ring 16 is disposed in the inner front regions of shell 12 and serves as an abutment or stop for flange 14 to prevent sealing washer 13 from leaving shell 12.

A secondary seal is formed between sealing washer 13 and shaft 20 by a ring 18 made of polytetrafluorethylene or the like and mounted co-axially with respect to washer 13 and shaft 20. Said ring has a frusto-conical surface 19, the angle of which with respect to the axis of the ring is slightly less than the angle of surface 15 on washer 13 relative to the same axis so that there is a slight divergence between the two surfaces resulting a substantial line contact between the two rings at the thinnest region of ring 18. Said thinnest region is disposed adjacent shaft 20. It is contemplated that ring 18 will be urged forwardly into the recess in sealing washer 13 and against frusto-conical surface 15 therein with sufficient force to cause the thinnest region of ring 18 to be deformed radially inwardly into contact with the adjacent shaft. The forwardly urging force is supplied, in the form chosen to illustrate this invention, by a plurality of circumferentially arranged springs, one of which is shown at 21 in FIG. 1. Each said spring 21 is disposed in a forwardly extending recess 22 formed in the rear portion 11 of retainer 10 and extends into contact with a rigid washer 23, the latter, in turn, contacting the rear face of ring 18. The free height of springs 21 is such that when flange 14 of sealing washer 13 abuts against snap ring 16, there is enough residual force in said springs 21 to cause ring 18 to be pushed against frusto-conical surface 15 and be deformed thereby so that its thin forward region is contracted and consequently is of a lesser diameter than the diameter of the shaft to which said ring is to be applied. Normally, however, the internal diameter of ring 18 is such as to allow the ring to slide relatively easily upon the shaft.

When the seal of FIG. 1 is to be assembled on a shaft from the left-hand end of the shaft, as viewed in FIG. 1, i.e., with washer 13 entering upon a shaft first, the contracted thin region of ring 18 must be expanded over the end of the shaft, otherwise damage to the ring 18 will result. Although this condition can be taken care of to some extent by a suitable chamfer or radius on the end of the shaft, this is not always satisfactory and does not always assure an assembly of ring 18 upon the shaft without damage to the forward end of the ring.

The foregoing problem is solved in the present invention in the following manner:

In the seal of this invention, as shown in FIGS. 2 to 8, inclusive, means are provided for limiting the forward movement of springs 21 in shell 12 so that the forward movement is arrested before there is contact under pressure between secondary sealing ring 18 and washer 13. In this manner there is no force applied to the thin forward region of ring 18 to cause it to bear against the frusto-conical surface 15 in washer 13 and hence there is no force tending to contract such thin forward region of the sealing ring 18. The means comprises modifying shell 12 and washer 23 in a manner to provide a bayonet-type connection between the washer and shell, as will be hereinafter made clear.

Figures 4, 5:
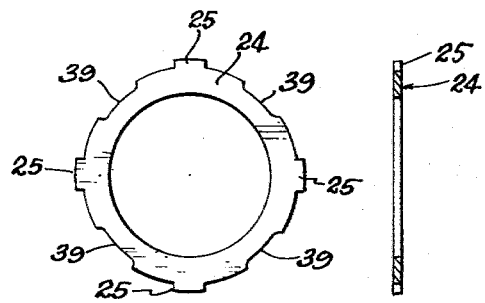
FIGS. 4 and 5 are, respectively, front and side elevations of a washer used in the seal assembly of FIG. 2.

Referring now to FIGS. 4 and 5, a new washer 24 has been substituted for rigid washer 23. Said washer 24 differs from washer 23 in that it is formed with four ears 25 located preferably 90 degrees apart, although any symmetrical arrangement about the axis of washer 24 will be satisfactory. Said ears 25 are of a size to extend through the shell of the retainer, whereas the main body of washer 24 is of approximately the same outside diameter as that of the previously used washer 23.

Figure 6:
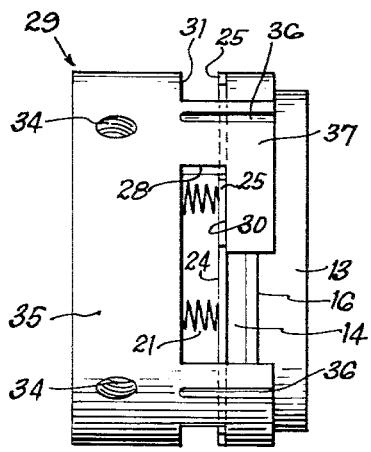
FIG. 6 is a side elevational view of the seal assembly of FIG. 2 prior to its installation on a shaft.
Figure 7:
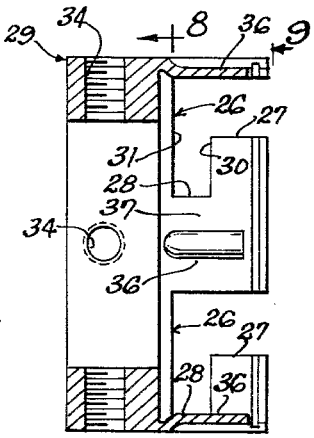
FIG. 7 is an axial section through the retainer used in the seal of FIG. 2.
Figure 8:
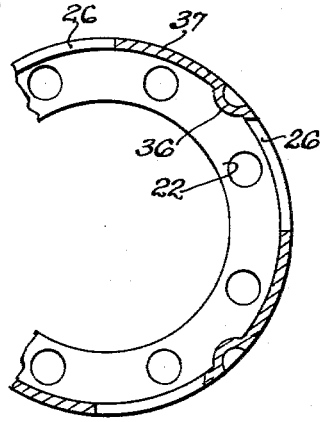
FIG. 8 is a fragmentary front elevational view in section of the retainer of FIG. 7, the section being taken along line 8—8 thereof.

Retainer 10 has been modified to have the form shown in FIGS. 6, 7 and 8 and given the reference character 29. The modification consists in punching out of the shell part 37 several bayonet-type slots 26, each of which has an axially extending portion 27 and a circumferentially extending portion 28 connected to the axially extending portion 27. Slots 26 are oriented about the axis of retainer 29 in the same manner as are ears 25 with reference to the axis of washer 24. The peripheral dimension of the axially extending portion 27 of each slot 26 is just wide enough to accommodate a lug 25. The axial dimension of the portion 28 of slot 26 is such that during normal operation of the seal, ears 25 will not contact the forward edge 30 nor the rear edge 31 of portion 28. Prior to assembly upon a shaft, however, and after the springs 21, washer 24, secondary sealing ring 18 and sealing washer 13 have been assembled in retainer 29 and locked therein by snap ring 16, ears 25 will abut upon the forward edge 30 of the regions 28 to limit movement of washer 24 out of the retainer 29. This position of washer 24 is to the rear of the position it would occupy if unhindered and if limited in its forward movement only by the fact that washer 13 has moved out of retainer 29 to such a degree that its flange 14 contacts snap ring 16. There is thus no force urging ring 18 forwardly against sealing washer 13 and hence there is no force tending to distort the forward thin edge of ring 18 to contract it inwardly as in the FIG. 1 form.

Figure 2:
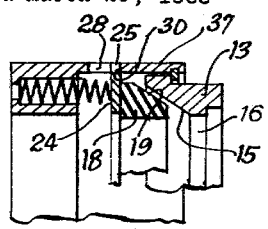
FIG. 2 is a section through a seal assembly of the type shown in FIG. 1 which has been modified in accordance with this invention.

The seal is assembled, but prior to installation upon the shaft, is shown in FIGS. 2 and 6. In both figures the ears 25 are shown extending through the slots 26 and in contact with the forward edges 30 of the portion 28. In FIG. 2 it may be noted that there is a space between the frusto-conical surface 19 on ring 18 and the frusto-conical surface 15 on sealing washer 13.

Figure 3:
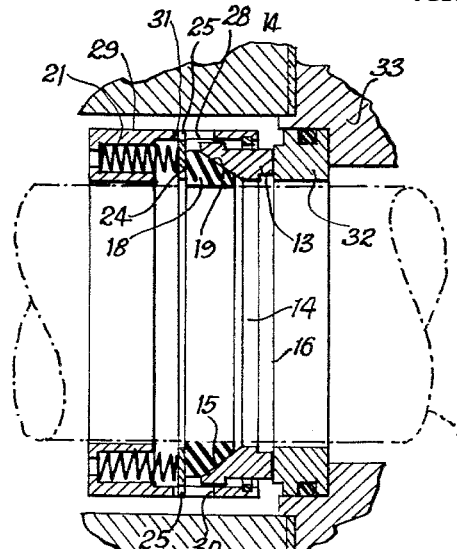
FIG. 3 shows the seal assembly of FIG. 2 in section as installed on a shaft.

Referring now to FIG. 3, the seal of FIG. 2 is shown as it appears when installed upon a shaft. Sealing washer 13 is designed to have a running fit with a seal seat 32 mounted on a portion of a housing 33. The retainer 29 is fastened to shaft 20 by four set screws which are adapted to be threaded into suitable openings 34 provided therefor in the rear portion 35 of retainer 29. The number of set screws used is of course immaterial to this invention. The location of retainer 29 relative to seat 32 is so selected that in the initial installation, with sealing washer 13 abutting upon seal seat 32, ears 25 will be adjacent to, but not in contact with, the rear edges 31 of the slots 28. This permits the springs 21 to be continuously effective resiliently to urge washer 24 against ring 18 and ring 18, in turn, against sealing washer 13, while at the same time permitting washer 13 to move backwardly a slight distance if required because of misalignment of the seal with respect to the seat 32, or because of slight axial vibrations of shaft 20. The remaining axial space between ears 25 and the forward edges 30 of the slots 28 is available to take up for wear of the sealing washer 13.

Figure 9:
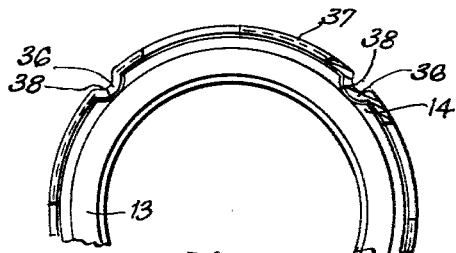
FIG. 9 is a fragmentary front elevational view of the retainer of FIG. 7 taken along line 9—9 thereof.

It is desirable in rotary shaft seals to provide a positive drive for the sealing washer 13 from the shaft with which it rotates to eliminate relative torque between the sealing washer and its adjacent flexible secondary sealing element. This drive is usually imparted to the washer through an interlocking connection between the washer and retainer for the washer. In the present invention the drive is comprised of a plurality of axially extending lugs 36 formed in the shell 37 of the retainer 29 as inwardly extending indentations, said lugs being received in corresponding notches 38 (FIG. 9) formed in the exterior surface of flange 14 of washer 13. It may be noted that the removal of the portions of the shell 37 represented by the notches 26 formed therein weakens the shell somewhat and the presence of the axially extending lugs 36 in the remaining portions of the shell provides such portions with increased stiffness which counteracts the weakening effect of the removal of the portions of the shell represented by the slots 26.

The inwardly extending lugs 36 are avoided by washer 24 by forming notches 39 in the periphery of the washer between ears 25. Said notches 39 are of a peripheral length which is substantially equal to the peripheral dimension of portion 28 of the slots 26. Thus, when the various elements of the seal are assembled into a retainer 29, the springs 21 are first placed in their respective recesses 22 and a washer 24 is then inserted into shell 37 with its ears 25 extending into the axially disposed portion 27 of a bayonet slot 26. During such relative disposition of the washer and retainer, lugs 36 are aligned with notches 39 in the washer 24. Said washer is then pressed inwardly to compress springs 21 until ears 25 are axially aligned with portions 28 of the slots 26, whereupon said washer 24 is rotated until ears 25 abut upon the ends of the peripherally extending portions 28. At this point washer 24 may be released and ears 25 will be moved forward into contact with the forward edges 30 of the portions 28. To complete the assembly a secondary sealing ring 18 is inserted into the retainer in abutting relation with the washer 24, with the frusto-conical surface 19 thereof facing outwardly of the retainer, and a sealing washer 13 is then inserted into the retainer with its frusto-conical surface 15 facing that of ring 18. The entire assembly is then locked in the retainer by the insertion of snap ring 16 into the groove provided therefor in the interior of shell 12.

When it is required to install the assembled seal upon a shaft such as 20, ring 18 is in its relaxed or undistorted condition and hence it is of a size which will readily slide upon the shaft. No special expanding tool is required for ring 18 nor is any special or unusual chamfer or radius required on the end of the shaft to cam ring 18 over its end.

Inasmuch as the torque impressed upon sealing washer 24 by seat 32 is taken by shell 37 through lugs 36 acting in notches 38 in washer 13, there is no force acting upon washer 24 tending to turn it relative to the retainer 29 and this is true irrespective of the direction of rotation of shaft 20 relative to seat 32. The use of a bayonet type of connection between washer 24 and shell 37 therefore introduces no new possibility of malfunction of the seal.

It may be apparent that the seal assembly of this invention provides a simple means for "unloading" the spring force from a secondary sealing element without adding materially to the complexity of the assembly, and more importantly, without altering the method of installation of the seal assembly on a shaft nor its interchangeability with seals made according to the prior design shown in FIG. 1.

We claim:

1. A seal assembly comprising a retainer, axially spaced abutments on the retainer; resilient means, a secondary sealing ring and a sealing washer all disposed between said abutments in serial arrangement with respect to one another, said resilient means bearing axially against one abutment and the sealing washer adapted to bear axially against the other of said abutments, said resilient means being in compression and tending to transmit its force through the secondary sealing ring to the sealing washer to hold said sealing washer against the abutment against which it bears, and means cooperating with the retainer and acting upon the resilient means for restraining the force of said resilient means, whereby to prevent the transmission of said force to the sealing washer through said secondary sealing ring.

2. A seal assembly comprising a retainer, axially spaced abutments on the retainer; resilient means, a pressure transmitting washer, a secondary sealing ring and a sealing washer all disposed between said abutments in serial arrangement with respect to one another, said resilient means adapted to bear axially against one of said abutments and the sealing washer being adapted to bear axially against the other of said abutments, said resilient means being in compression and tending to transmit its force through the pressure-transmitting washer and the secondary sealing ring to the sealing washer to hold said sealing washer against the abutment against which it bears, and releasable interlocking means on the retainer and pressure transmitting washer for holding said last-mentioned washer a predetermined distance away from one of said abutments.

3. A seal assembly comprising a retainer, axially spaced abutments on the retainer; resilient means, a pressure transmitting washer, a secondary sealing ring and a sealing washer all disposed between said abutments in serial arrangement with respect to one another, said resilient means adapted to bear axially against one of said abutments and the sealing washer being adapted to bear axially against the other of said abutments, said resilient means being in compression and tending to transmit its force through the pressure transmitting washer and the secondary sealing ring to the sealing washer to hold said sealing washer against the abutment against which it bears, and a radially outwardly extending ear on the pressure transmitting washer, said retainer having a bayonet slot adapted to receive said ear, whereby to limit movement of the pressure transmitting washer axially toward the sealing washer and thus relieve the secondary sealing ring of axially directed compressive forces.

4. A seal assembly comprising a cylindrical retainer, axially spaced radial abutments on the retainer, resilient means, a pressure transmitting washer, a secondary sealing ring and a sealing washer, all disposed between said abutments in serial arrangement with respect to one another, said resilient means adapted to bear axially against one of said abutments and the sealing washer being adapted to bear axially against the other of said abutments, said resilient means being in compression and tending to transmit its force through the pressure transmitting washer and the secondary sealing ring to the sealing washer to hold said sealing washer against the abutment against which it bears, interlocking means on the pressure transmitting washer and the retainer for limiting movement of the pressure transmitting washer axially toward the sealing washer, whereby to relieve the secondary sealing ring of axially directed compressive forces, and interlocking means on the sealing washer and retainer for limiting relative movement between the washer and retainer to axial movement.

5. A seal assembly comprising a retainer having a rear region of relatively small internal diameter adapted to be secured to a shaft or the like, and a front region of relatively large internal diameter, said rear region having recesses therein facing the front region, a snap ring in the front region; a pressure transmitting washer, a secondary sealing ring and a sealing washer in the front portion, said sealing washer being adapted to abut on the snap ring whereby to retain the washer in the retainer, resilient means in the said recesses and bearing against the pressure transmitting washer to urge said pressure transmitting washer toward said sealing washer, and ears on said pressure transmitting washer extending radially outwardly, said retainer having bayonet slots to receive said ears, said slots having a peripherally extending edge against which the ears are adapted to bear, whereby to limit movement of said pressure transmitting washer toward said sealing washer.

6. A seal assembly as described in claim 5, said sealing washer having a recess therein defined by a frusto-conical surface and said secondary sealing ring having a frusto-conical surface of substantially the same cone angle as that of the frusto-conical surface in the sealing washer, such that axial movement of the secondary sealing ring into said recess produces a radially inwardly directed component of the axial movement of the secondary sealing element to contract said secondary sealing ring.

7. A seal assembly as described in claim 5, said sealing washer having a recess therein defined by a frusto-conical surface and said secondary sealing ring having a frusto-conical surface of substantially the same cone angle as that of the frusto-conical surface in the sealing washer, such that axial movement of the secondary sealing ring into said recess produces a radially inwardly directed component of the axial movement of the secondary sealing element to contract said secondary sealing ring, and interlocking means in the sealing washer and retainer for limiting relative movement between the washer and retainer to axial movement.

References Cited by the Examiner

UNITED STATES PATENTS 2,931,631 4/1960 Harrison _____ 277—3 X
3,100,105 8/1963 Randall _____ 277—65 X SAMUEL ROTHBERG, Primary Examiner.